United States Patent
Hawthorne et al.

(10) Patent No.: US 8,457,817 B2
(45) Date of Patent: Jun. 4, 2013

(54) DISTRIBUTED TRAIN INTELLIGENCE SYSTEM AND METHOD

(75) Inventors: Michael Hawthorne, Arlington, TX (US); Marshall G. Beck, Fineview, NY (US)

(73) Assignee: New York Air Brake Corporation, Watertown, NY (US)

( * ) Notice: Subject to any disclaimer, the term of this patent is extended or adjusted under 35 U.S.C. 154(b) by 1142 days.

(21) Appl. No.: 12/091,196

(22) PCT Filed: Jan. 3, 2007

(86) PCT No.: PCT/US2007/060036
§ 371 (c)(1),
(2), (4) Date: Apr. 23, 2008

(87) PCT Pub. No.: WO2007/095401
PCT Pub. Date: Aug. 23, 2007

(65) Prior Publication Data
US 2008/0281477 A1 Nov. 13, 2008

Related U.S. Application Data

(60) Provisional application No. 60/772,569, filed on Feb. 13, 2006.

(51) Int. Cl.
*G06F 17/00* (2006.01)
*G06F 19/00* (2006.01)

(52) U.S. Cl.
USPC .................................. 701/20; 701/19; 701/70

(58) Field of Classification Search
None
See application file for complete search history.

(56) References Cited

U.S. PATENT DOCUMENTS

| | | | |
|---|---|---|---|
| 5,950,967 A * | 9/1999 | Montgomery | 246/182 R |
| 6,144,901 A | 11/2000 | Nickles et al. | |
| 6,334,654 B1 * | 1/2002 | Root et al. | 303/7 |
| 6,401,015 B1 * | 6/2002 | Stewart et al. | 701/19 |
| 6,434,452 B1 | 8/2002 | Gray | |
| 6,671,591 B2 | 12/2003 | Wolf et al. | |
| 6,691,957 B2 | 2/2004 | Hess, Jr. et al. | |
| 7,664,459 B2 * | 2/2010 | Smith et al. | 455/7 |
| 2003/0183729 A1 * | 10/2003 | Root et al. | 246/167 R |
| 2005/0120904 A1 * | 6/2005 | Kumar et al. | 105/35 |
| 2007/0233335 A1 * | 10/2007 | Kumar et al. | 701/22 |

FOREIGN PATENT DOCUMENTS

RU 2238860 C1 10/2004

* cited by examiner

*Primary Examiner* — Khoi Tran
*Assistant Examiner* — Bao Long T Nguyen
(74) *Attorney, Agent, or Firm* — Barnes & Thornburg LLP

(57) ABSTRACT

A system and method which may include on each locomotive a propulsion system and a braking system; a transceiver for communication between the locomotives; and sensors for sensing operational conditions on the locomotive. A processor receives the sensed operation conditions, communicates information including the sensed operational conditions to the other locomotive, determines a propulsion or braking value or command based on the sensed operational conditions, pre-selected criteria and the information received from the other locomotive, and outputs the propulsion or braking value or command. The present system may include on each locomotive a location determining device and a storage of track topology; and the processor determines and communicates to the other locomotive as information an initial propulsion or braking value using the topology of the present and projected location of the locomotive and pre-selected criteria, determines a final propulsion or braking value or command based on the initial value and the information received from the other locomotive, and outputs the final propulsion or braking value.

18 Claims, 4 Drawing Sheets

DISTRIBUTED TRAIN INTELLIGENCE SYSTEM AND METHOD

BACKGROUND AND SUMMARY OF THE INVENTION

The present invention relates generally to a distributed power system and more specifically to an intelligent distributed power system.

The distributed power system generally includes a master locomotive setting throttle/brake and transmitting information to slave locomotives to set their throttle/brakes. An early system is disclosed in U.S. Pat. No. 3,380,399 to Southard et al. The ability of the remote locomotive to receive a throttle command from the master locomotive and make a modification to conserve fuel in a train consists is described in U.S. Pat. No. 4,344,364 to Nickles et al. The ability of the remote locomotive to transmit back diagnostic information is described in U.S. Pat. No. 5,570,284 by Roselli et al. The distributed power settings being determined at and transmitted from the master unit to a slave unit based on the topography and location of the master and slave units is described in U.S. Pat. No. 6,144,901 to Nickles et al., as well as U.S. Pat. No. 5,950,967 to Montgomery.

The present system includes on each locomotive a propulsion system and a braking system; a transceiver for communication between the locomotives; and sensors for sensing operational conditions on the locomotive. A processor receives the sensed operational conditions, communicates information including the sensed operational conditions to the other locomotive, determines a propulsion or braking value/command based on the sensed operational conditions, pre-selected criteria, and the information received from the other locomotive, and outputs the propulsion or braking value/command.

The processor may determine and communicate to the other locomotives as part of the information an initial propulsion or braking value based on the sensed operational conditions, pre-selected criteria and sensed operation conditions received from the other locomotive; and the processor determines a final propulsion or braking value/command based on the sensed operational conditions, the pre-selected criteria and the information received from the other locomotive.

The present method of controlling the propulsion and braking systems of each locomotive includes receiving sensed operational conditions of the locomotive; communicating information including the sensed operational conditions to the other locomotive; determining a propulsion or braking value/command based on the sensed operational conditions, pre-selected criteria and the information received from the other locomotive; and controlling the propulsion and braking system using the propulsion or braking value/command.

The determining of a propulsion or braking value/command may include determining and communicating to the other locomotive as part of the information an initial propulsion or braking value based on the sensed operational conditions, pre-selected criteria and sensed operation conditions received from the other locomotive; and determining a final propulsion or braking value/command based on the sensed operational conditions, the pre-selected criteria and the information received from the other locomotive.

The present system includes on each locomotive a propulsion system and a braking system; a transceiver for communication between the locomotives; and a location determining device and a storage of track topology. A processor determines and communicates to the other locomotive as information an initial propulsion or braking value using the topology of the present and projected location of the locomotive and pre-selected criteria, determines a final propulsion or braking value/command based on the initial value and the information received from the other locomotive, and outputs the final propulsion or braking value/command.

The system may include sensors for sensing operational conditions and the processor receives and communicates the sensed operational conditions as information including the sensed operational conditions to the other locomotive. The processor determines one of the initial and final propulsion or braking values based on the sensed operational conditions, pre-selected criteria, topology, and the information received from the other locomotive.

The present method of controlling the propulsion and braking systems of each locomotive includes determining topology of the present and projected location of the locomotive; determining and communicating to the other locomotive as information an initial propulsion or braking value using the topology of the present and projected location of the locomotive and pre-selected criteria; determining a final propulsion or braking value/command based on the initial value and the information received from the other locomotive; and controlling the propulsion and braking system using the propulsion or braking value/command.

The method may include receiving and communicating as information sensed operation conditions of the locomotive; and determining one of the initial and final propulsion or braking values/command based on the sensed operational conditions, pre-selected criteria, topology, and the information received from the other locomotive.

Other objects, advantages and novel features of the present disclosure will become apparent from the following detailed description when considered in conjunction with the accompanying drawings.

DETAILED DESCRIPTION OF THE PREFERRED EMBODIMENTS

Figure 1:
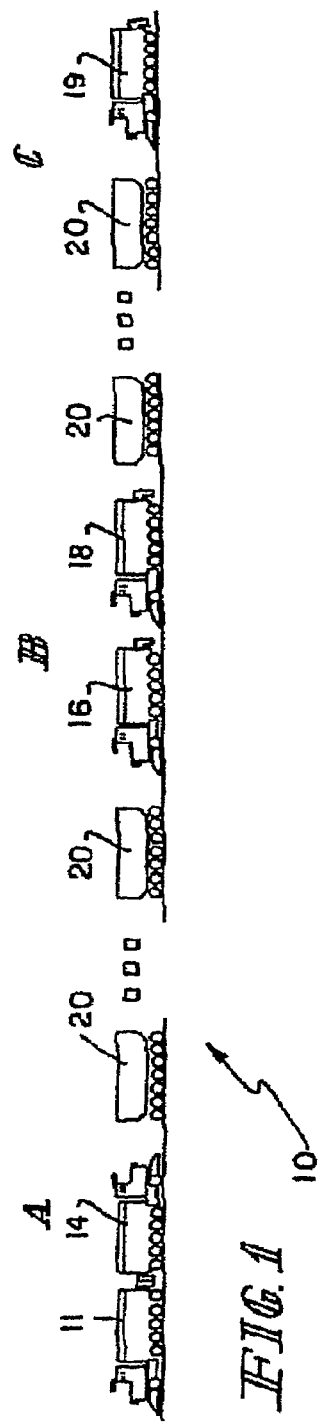
FIG. 1 is schematic view of a train which incorporates the intra-train communication network of the present system.

As shown in FIG. 1, train 10 includes a plurality of locomotives 11, 14, 16, 18 and 19 in a train with a plurality of cars 20. Locomotive 11 and 14 form a consist A, locomotives 16 and 18 form a consist B and locomotive 19 forms a consist C. One of the locomotives is designated a lead locomotive and the others are considered trail and/or remote locomotives. In the industry, if locomotive 11 is the lead, locomotives 16 and 19 are remote and locomotives 14 and 18 are trail.

Using the train as shown in FIG. 1, locomotives 11, 16 and 19 would have LEADER systems which would independently make decisions. Since 14 is connected to 11, it can receive its control information directly from 11. Similarly 18 even though it is not interconnected to 16 as a multi-unit consist it may also either receive its information from 16 or also be LEADER equipped. As an alternative, all the locomotives 11, 14, 16, 18 and 19 may have a LEADER equipment type system onboard.

The lead locomotive, that locomotive having an engineer at the controls, communicates commands and controls to the remote locomotives. The lead and remote locomotives communicates commands and controls to their trail locomotives. Typically, the lead and remote locomotive communicate by radio while they communicate to their respective trail locomotives over a wire. The commands and controls may include, for example, setting the direction control, setting the throttle, set up dynamic braking, set up the operating modes, interlock dynamic brakes, as well as turning on and off various ancillary functions. The trail locomotives transmit status messages or exception message back to the lead locomotive. The status may include locomotive identification, operating mode and tractive-braking efforts. The exception message includes various faults such as wheel slip, locomotive alarm indicator, incorrect brake pressure, low main reservoir pressure, throttle setting, etc.

Each of the locomotives includes a transceiver to transmit and receive messages. While the preferred embodiment will be described with respect to radio frequency communication between the locomotives or at least between the locomotive consists, if not between all locomotives, the same principles can be applied to communication along a wire where multiple communications may be taking place. Thus, for example, if there is a wire running throughout the train through locomotives 11, 14, 16, 18 and 19 and cars 20, and the locomotives form one network and the cars form another network, the same method may be used to allow private communication in either of the networks.

Math models of a LEADER System, monitors parameters and performs calculations based on the current energy state of the train to create a real-time display of train dynamics. The power of LEADER system resides in its ability to provide information allowing the crew to better control the train, minimizing loss of energy. Loss of energy via over-braking represents fuel unnecessarily consumed. Energy imparted to the cargo of the train represents potential damage to lading, equipment and rail. Both phenomena are undesirable and addressable with the LEADER system from New York Air Brake Corporation. Although the LEADER system will be used to describe the present system and method, any other processors or systems with the same capabilities may be programmed to perform the present method.

Figure 2:
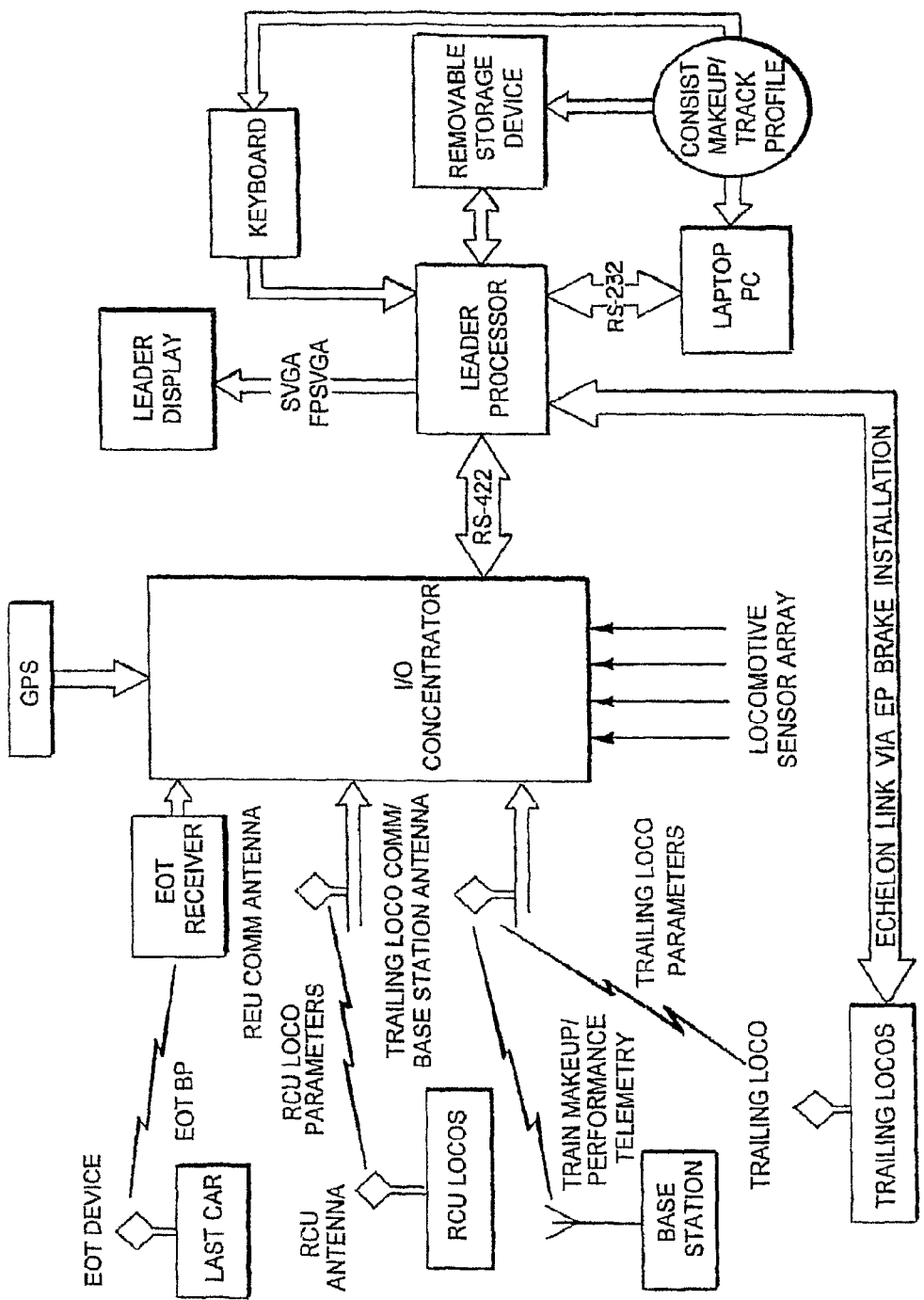
FIG. 2 is a block diagram of the system components of a locomotive assist display and event recorder system according to the principles of the present system.

The LEADER system is comprised of a number of subsystems each with specific duties. FIG. 2 shows a generic LEADER architecture. The user interface of the LEADER system is the real-time display which shows a graphical and numerical representation of the current state of the train as shown in FIG. 5 of U.S. Pat. No. 6,144,901, which is incorporated herein by reference. Radio communication is established between the lead locomotive, the trailing locomotives in the lead consist, and locomotives in the remote consist to report the necessary parameters from each of these locomotives necessary to perform LEADER calculations. Consist information is entered via the key pad on the real-time display, a wired communication source (laptop PC or removable storage device) or via wayside radio communication. Position is determined from wheel movement sensors and a Global Positioning System (GPS). The Input/Output (I/O) Concentrator gathers all of the various locomotive parameters necessary for LEADER algorithm calculations and reports the information to the LEADER Computer. The LEADER Processor, a high throughput capacity computer platform using a Real Time Operating System (RTOS), then performs the calculations required by the LEADER algorithms and the real-time display is updated. All of these sub-systems combine to form the LEADER System.

Each locomotive in a LEADER train will require at a minimum, the I/O Concentrator with communication capability to the head end. A LEADER Processor and Display are only required for the lead locomotive. Tuning algorithms may alleviate the need for I/O Concentrators on each locomotive.

The LEADER system is capable of three operating modes, each building on the previous mode. The three modes advance the LEADER system from a real-time display passively providing information to the locomotive engineer (information only mode) to a LEADER system that will make suggestions to the locomotive engineer on how to better handle the train (driver assist mode) and finally to a control system that is capable of issuing commands to optimally control the locomotive (cruise control mode).

In the information only mode, the locomotive engineer makes all of the decisions and solely activates the various control systems in a manual mode. The LEADER system provides information to the engineer that is not currently available to him/her to use to manage various locomotive control systems. In driver assist mode, the LEADER system determines and displays the optimum locomotive power dynamic brake throttle setting and the locomotive and car brake control settings. These settings are determined at the head end locomotive for the head end locomotives and the remotely controlled locomotives. These recommendations or desired settings are displayed to the locomotive engineer who can then elect to manually move the various controls to achieve these settings. In the cruise control mode, LEADER derived settings are used to automatically control the locomotive power and braking systems, the train brake system of each car and ancillary systems which effect train movement. The locomotive engineer serves as an operational supervisor with the ability to manually override the cruise control. Cruise control can also be produced by communication links between the LEADER and the railroad central traffic control center.

The development of LEADER began over 20 years ago with early efforts to create the Train Dynamics Analyzer (TDA), a computer math model used to predict in-train forces. The train dynamic modeling techniques and algorithms embodied in the TDA are described in U.S. Pat. No. 4,041,283.

For distributed control in the classic LEADER system, processing is centralized in a single, lead locomotive. Although the other locomotives may have processors, the processors are subordinate to the lead locomotive. The lead locomotive has a processing node that is in communication with other locomotives in the train via radio. In this processing mode, a LEADER processor issues commands to all locomotives from the centralized, lead processor node and actuated locally.

In the present system and method, LEADER processing can be distributed across some or all locomotives in the train, each with a processing node in communication with other processing nodes on other locomotives in the train. This architecture creates a set of peer processors rather than a lead/subordinate arrangement. The communication between processing nodes serves two purposes. The first purpose is to gather and collect required data to itself representing the operating state or operating conditions of each locomotive. Each distributed processing node uses the state of all locomotives to arrive at a control solution that best meets the goal of the train movement. Each processing node is capable of locally actuating the commands required to achieve its control solution. The processing node will be in communication with the other nodes which are also arriving at a control solution. The nodes can have the ability to compare the solutions that it found locally with the other peer nodes and collectively vote on or propose the solution. After voting, the nodes can advise each other if consensus is reached or not. If no consensus is reached, the process may be restarted automatically, by the operator or overridden by the operator.

This system distinguishes itself from the classic, centralized approach to train control by allowing each locomotive, based on a full understanding of the train behavior, to arrive at a local control solution to optimize performance. It further provides for each control node to compare its solution with those of the other nodes in the train to reach consensus on the overall train control strategy. Each processing node would have knowledge of the operating goal set including weighted criteria (time, fuel, forces, etc.) and constraining limits (in-train forces, speed limits, stall speed, etc.). Each processing node would also employ tuning algorithms to match LEADER's train dynamic models to the current environment. The tuning is described in US published patent application US 2004-0093196-A1, which is incorporated herein by reference The present system includes on each locomotive a propulsion system and a braking system; a transceiver for communication between the locomotives; and sensors for sensing operational conditions on the locomotive. A processor performs the method illustrated in FIG. 3. It receives the sensed operation conditions as information at step 20. It communicates information including the sensed operational conditions to the other locomotive at step 22. It determines a propulsion or braking value/command based on the sensed operational conditions, pre-selected criteria and the information received from the other locomotive at step 24. The propulsion or braking value/command is outputted at step 26. This may be to a display for control by the operator or to automatically control the propulsion or brake systems. Whereas the lead locomotives can operate in all three modes (information, driver assist, cruise control), the other locomotive can only operate in the cruise control modes and thus issue commands. Thus in the present system and method, each locomotive makes an independent decision based on information that it and other locomotives have collected.

Figure 3:
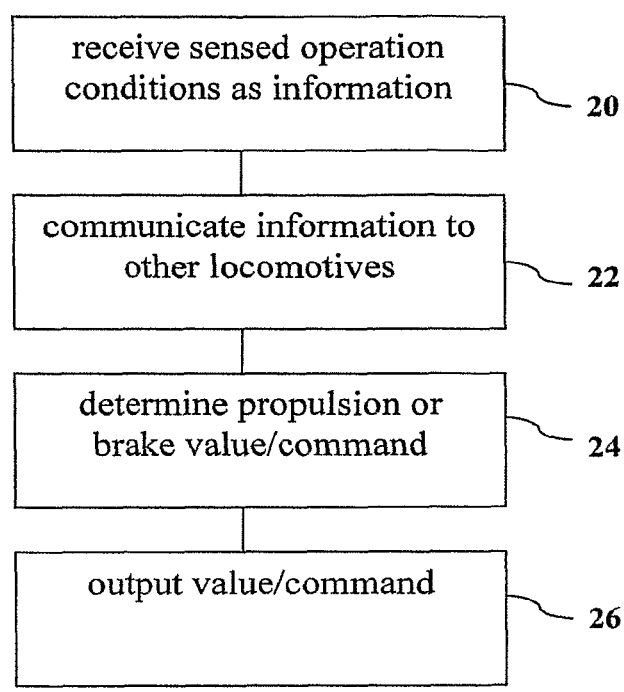
FIG. 3 is a flow chart of one embodiment of the present method.
Figure 4:
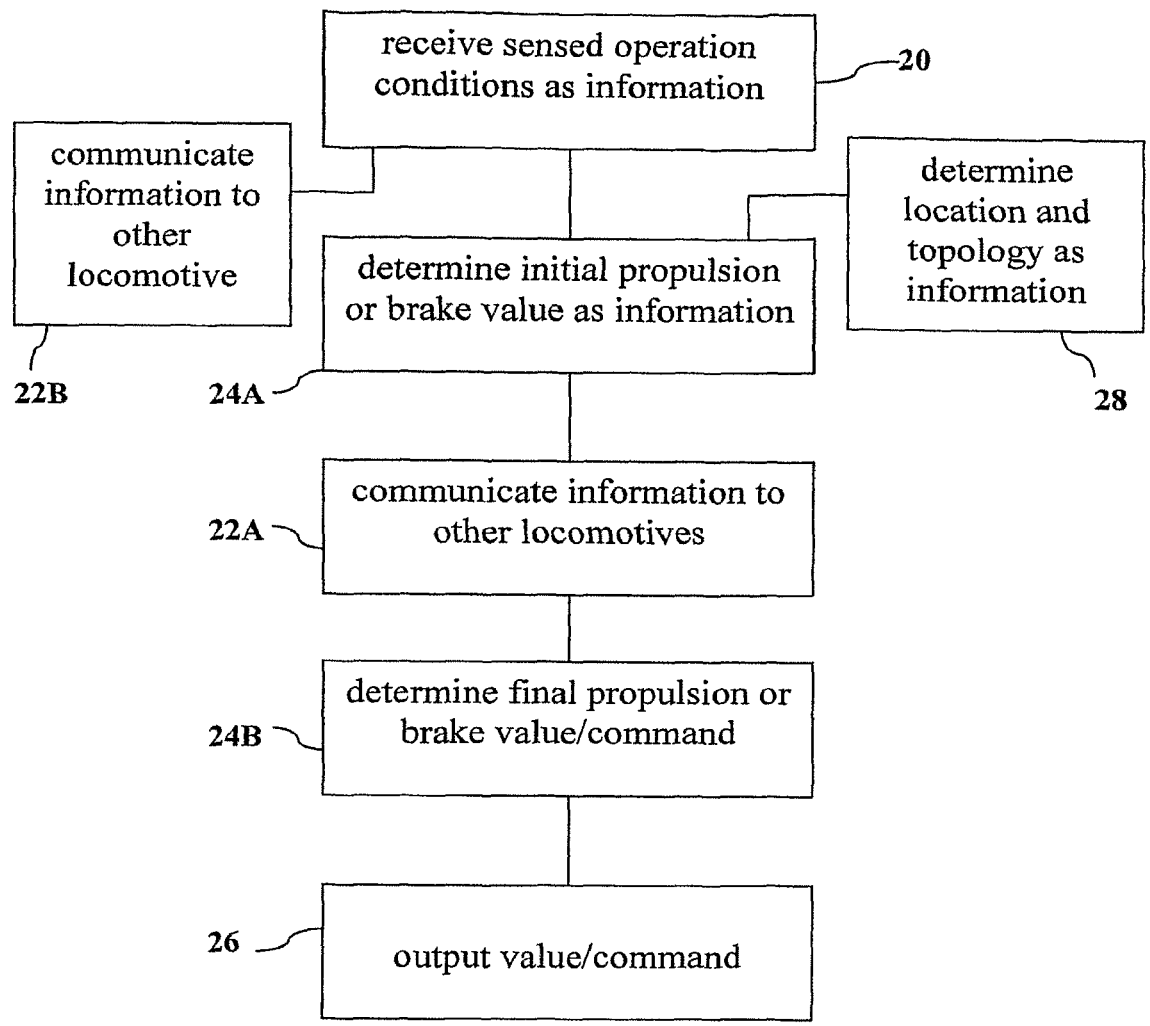
FIG. 4 is a flow chart of another embodiment of the present method.

FIG. 4 illustrates a modification of the method of FIG. 3. Where appropriate, the same reference numbers have been used. The processor receives the sensed operation conditions as information at step 20. It determines its location and the topology of the track at present and projected location of the locomotive at step 28. The processor determines an initial propulsion or braking value as information based on the sensed operational conditions, pre-selected criteria and/or the topology of the track at present and projected location of the locomotive at step 24A. It communicates information including the sensed operational conditions and/or initial propulsion or braking value to the other locomotive at step 22A. It determines a final propulsion or braking value/command based on the sensed operational conditions, pre-selected criteria and the information received from the other locomotive at step 24B. The propulsion or braking value/command is outputted at step 26.

The initial propulsion or braking value may use only the sensed operational conditions or the topology of the track at present and projected location of the locomotive at step 24A with the pre-selected criteria. As shown by step 22B, operational conditions may be communicated to the other locomotive before the determination of the initial propulsion or braking value at step 24A, and thus can be used in making the initial value determination.

Although the present invention has been described and illustrated in detail, it is to be clearly understood that the same is by way of illustration and example only and is not to be taken by way of limitation. The scope of the present invention is to be limited only by the terms of the appended claims.

What is claimed is:

1. In a train having at least two locomotives, each locomotive comprising:
    a propulsion system and a braking system;
    a transceiver for communication between the locomotives;
    sensors for sensing operational conditions on the locomotive;
    a processor receiving the sensed operation conditions, communicating information including the sensed operational conditions to the other locomotive, determining a propulsion or braking value based on the sensed operational conditions, pre-selected criteria and the information received from the other locomotive, and outputting the propulsion or braking value or command
    wherein the processor determines and communicates to the other locomotive as part of the information an initial propulsion or braking value based on the sensed operational conditions, pre-selected criteria and sensed operation conditions received from the other locomotive; and the processor determines a final propulsion or braking value or command based on the sensed operational conditions, the pre-selected criteria and the information received from the other locomotive, and
    wherein the processor located on each locomotive interacts with the processor on the at least one other locomotive in a peer relationship, wherein each processor receives required data representing the operating state or operating conditions for each locomotive and uses that data to locally find a control solution, and
    wherein each processor controls local actuation of locomotive commands required to achieve the control solution, each processor is in communication with the other processors which also arrive at their own control solution, each processor is configured to compare its locally control solution with the control solution of the processor of the at least one other locomotive, and the processors of the at least two locomotives collectively vote on or propose a control solution for actuation by the at least two locomotives.

2. The train according to claim 1, wherein the processor located on each locomotive compares its initial propulsion or braking value with the received initial propulsion or braking value from the other locomotive if there is a discrepancy there between before determining the final propulsion or braking value or command.

3. The train according to claim 1, wherein each locomotive includes a location determining device and the processor located on each locomotive communicates the location as part of the information to the other locomotive and determines the propulsion or braking value or command using the sensed operational conditions, the pre-selected criteria, the determined location and the information received from the other locomotive.

4. The train according to claim 1, wherein each locomotive includes a location determining device and a storage of track topology and the processor located on each locomotive determines the propulsion or braking value or command using the topology of the present and projected location of the locomotive.

5. The train according to claim 1, wherein the processor located on each locomotive outputs the propulsion or braking command to the propulsion or braking systems as a control input.

6. The train according to claim 1, wherein each locomotive includes a display and the processor located on each locomotive outputs the propulsion or braking value to the display.

7. The train according to claim 1, wherein the two locomotives are separated by at least one non-powered car.

8. The train according to claim 1, wherein the operational conditions include one or more of speed, coupler forces, slack action, propulsion setting and braking setting.

9. The train according to claim 1, wherein the processor located on each locomotive includes a train dynamic model program to determine the propulsion or braking value or command and estimated train operational conditions using initial train parameters; and the processor located on each locomotive compares the sensed and the estimated operational conditions and adjusts the initial train parameter as necessary based on the comparison.

10. In a train having at least two locomotives, a method of controlling the propulsion and braking systems of each locomotive comprising:
receiving sensed operation conditions of the locomotive at a processor located on each locomotive;
communicating information including the sensed operational conditions to the processor of the other locomotive;
locally determining by each processor a propulsion or braking command based on the sensed operational conditions, pre-selected criteria and the information received from the other locomotive;
locally controlling the propulsion and braking system of each locomotive using the propulsion or braking command, wherein locally determining a propulsion or braking command includes locally determining and communicating to the other locomotive as part of the information an initial propulsion or braking value based on the sensed operational conditions, pre-selected criteria and sensed operation conditions received from the other locomotive; and
locally determining a final propulsion or braking command based on the sensed operational conditions, the pre-selected criteria and the information received from the other locomotive,
wherein the processor located on each locomotive interacts with the processor on the at least one other locomotive in a peer relationship, wherein each processor receives required data representing the operating state or operating conditions for each locomotive and uses that data to locally find a control solution, and
wherein each processor controls local actuation of locomotive commands required to achieve the control solution, each processor is in communication with the other processors which also arrive at their own control solution, each processor is configured to compare its locally control solution with the control solution of the processor of the at least one other locomotive, and the processors of the at least two locomotives collectively vote on or propose a control solution for actuation by the at least two locomotives.

11. The method according to claim 10, including comparing its initial propulsion or braking value with the received initial propulsion or braking value from the other locomotive to determine if there is a discrepancy there between before determining the final propulsion or braking command.

12. The method according to claim 10, including determining location of the locomotive and topology of the present and projected location of the locomotive; and
determining the propulsion or braking command using the sensed operational conditions, the pre-selected criteria, the determined topology of the present and projected location of the locomotive and the information received from the other locomotive.

13. The method according to claim 10, wherein each locomotive includes a display for the determined propulsion or braking value; and an operator in one of the locomotives controls the propulsion and braking system using the displayed propulsion or braking command.

14. The method according to claim 10, wherein the two locomotives are separated by at least one non-powered car.

15. The method according to claim 10, wherein the operational conditions include one or more of speed, coupler forces, slack action, propulsion setting and braking setting.

16. The method according to claim 10, wherein a train dynamic model program is used to determine the propulsion or braking command and estimated train operational conditions using initial train parameters; and including comparing the sensed and the estimated operational conditions and adjusting the initial train parameter as necessary based on the comparison.

17. In a train having at least two locomotives, each locomotive comprising:
a propulsion system and a braking system;
a transceiver for communication between the locomotives;
a location determining device and a storage of track topology;
a processor locally determining and communicating to the other locomotive as information an initial propulsion or braking value using the topology of the present and projected location of the locomotive and pre-selected criteria, locally determining a final propulsion or braking value or command based on the initial value and the information received from the other locomotive, and outputting the final propulsion or braking value or command; and
sensors for sensing operational conditions,
wherein each processor receives and communicates the sensed operational conditions as information including the sensed operational conditions to the processor of the at least one other locomotive, and each processor determines one of the initial and final propulsion or braking values or command based on the sensed operational conditions, pre-selected criteria, topology, and the information received from the at least one other locomotive,
wherein the processor located on each locomotive interacts with the processor on the at least one other locomotive in a peer relationship, wherein each processor receives required data representing the operating state or operating conditions for each locomotive and uses that data to locally find a control solution, and
wherein each processor controls local actuation of locomotive commands required to achieve the control solution, each processor is in communication with the other processors which also arrive at their own control solution, each processor is configured to compare its locally control solution with the control solution of the processor of the at least one other locomotive, and the processors of the at least two locomotives collectively vote on or propose a control solution for actuation by the at least two locomotives.

18. In a train having at least two locomotives, a method of controlling the propulsion and braking systems of each locomotive comprising:
determining topology of the present and projected location of the locomotive;
locally determining, by a processor located on each locomotive, and communicating to the at least one other locomotive, as information, an initial propulsion or braking value using the topology of the present and projected location of the locomotive and pre-selected criteria;

locally determining locally by the processor located one each locomotive a final propulsion or braking value based on the initial command and the information received from the at least one other locomotive;

controlling the propulsion and braking system using the propulsion or braking command;

receiving and communicating, as information, sensed operation conditions of the locomotive; and determining one of the initial and final propulsion or braking value and command based on the sensed operational conditions, pre-selected criteria, topology, and the information received from the other locomotive, wherein the processor located on each locomotive interacts with the processor on the at least one other locomotive in a peer relationship, wherein each processor receives required data representing the operating state or operating conditions for each locomotive and uses that data to locally find a control solution, and wherein each processor controls local actuation of locomotive commands required to achieve the control solution, each processor is in communication with the other processors which also arrive at their own control solution, each processor is configured to compare its locally control solution with the control solution of the processor of the at least one other locomotive, and the processors of the at least two locomotives collectively vote on or propose a control solution for actuation by the at least two locomotives.

* * * * *